United States Patent [19]

Barkhoudarian

[11] Patent Number: 5,040,415
[45] Date of Patent: Aug. 20, 1991

[54] NONINTRUSIVE FLOW SENSING SYSTEM

[75] Inventor: Sarkis Barkhoudarian, Canoga Park, Calif.

[73] Assignee: Rockwell International Corporation, El Segundo, Calif.

[21] Appl. No.: 539,417

[22] Filed: Jun. 15, 1990

[51] Int. Cl.⁵ .......................... G01F 1/66; G01L 11/00
[52] U.S. Cl. ................................. 73/198; 73/861.03; 73/861.27; 73/703; 73/730; 374/143
[58] Field of Search ............... 73/861.02, 861.03, 198, 73/861.27, 861.28, 703, 730; 374/143

[56] References Cited

U.S. PATENT DOCUMENTS

| | | | |
|---|---|---|---|
| 4,015,470 | 4/1977 | Morrison | 73/861.03 |
| 4,240,299 | 12/1980 | Joy et al. | 73/861.03 |
| 4,420,980 | 12/1983 | Dunemann et al. | 73/730 |
| 4,535,631 | 8/1985 | Sinha et al. | 73/703 |

Primary Examiner—Herbert Goldstein
Attorney, Agent, or Firm—H. Frederick Hamann; Harry B. Field; Steven E. Kahm

[57] ABSTRACT

A nonintrusive flow sensing system (10) and related method are provided for monitoring fluid flow within a conduit (14), particularly such as a liquid flow (12). The sensing system (10) includes an array of ultrasonic transducers (18, 20, 24, 26) mounted on the conduit (14) and adapted to send and receive pulsed ultrasonic signals bidirectionally across the conduit with an upstream-downstream component of direction, and through the conduit in longitudinal and circumferential directions. Signal transit times are processed to obtain accurate measurements of liquid flow velocity, temperature and pressure.

10 Claims, 2 Drawing Sheets

1

NONINTRUSIVE FLOW SENSING SYSTEM

BACKGROUND OF THE INVENTION

This invention relates generally to an improved system and method for detecting and monitoring fluid flow parameters such as liquid flow within a conduit. More particularly, this invention relates to a sensing system and method for measuring fluid flow velocity, temperature and pressure in a nonintrusive or noninvasive manner.

Fluid flow conduits are widely used in industrial processes and the like to deliver fluids in liquid or gaseous form from one location to another. In many instances, it is necessary or desirable to monitor the fluid flow to insure proper and/or safe operation of process equipment. As one example, in a nuclear power plant facility, it is necessary to monitor various liquid flow parameters such as flow rate, temperature, and pressure. Accordingly, in the prior art, a variety of flow monitoring devices and techniques have been developed for this purpose. However, in general, these prior art devices and methods for monitoring fluid flows have utilized invasive temperature and/or pressure probes mounted to extend through ports in a flow conduit into direct contact with the fluid flow stream. This requirement for probe ports in the conduit typically results in a monitoring system which is relatively costly to fabricate and maintain, and further wherein the probe ports present leakage sites for escape of potentially hazardous process fluid.

In recent years, noninvasive sensing systems have been developed particularly for use in monitoring certain flow parameters of a liquid flow within a conduit. Such noninvasive systems have utilized ultrasonic transducers mounted on the exterior of a flow conduit and adapted to bidirectionally transmit and receive pulsed signals diagonally through the conduit and flow stream therein. By measuring the upstream and downstream transit times of these pulsed signals, it is possible to calculate the flow velocity of the liquid flow steam. Moreover, with this transit time information, it is also possible to calculate the speed of sound in the liquid flow stream.

While noninvasive sensing systems of the type described above are extremely desirable in many operating environments, their practical utility has been limited to monitoring of a relatively small number of flow parameters. More specifically, noninvasive systems have not been designed for obtaining accurate and reliable measurements of the temperature and pressure of the flow stream. To obtain measurements of temperature and pressure, resort to invasive type monitoring devices has generally been required.

There exists, therefore, a significant need for further improvements in sensing systems and methods for noninvasive monitoring of fluid flow within a conduit, particularly with respect to monitoring of additional fluid parameters such as temperature and pressure. The present invention fulfills these needs and provides further related advantages.

SUMMARY OF THE INVENTION

In accordance with the invention, an improved flow sensing system is provided for monitoring fluid flow within a conduit. The system includes a plurality of nonintrusive or noninvasive transducers for sending and receiving a plurality of signals, such as pulsed ultrasonic signals, through the conduit and/or the flow stream therein, in combination with means for analyzing the relative transit times of the signals to derive fluid flow velocity, temperature and pressure. The system is particularly adapted for monitoring a liquid flow stream.

The flow sensing system includes a pair of ultrasonic flowmeter transducers mounted on opposite sides of the conduit at longitudinally spaced positions. These flowmeter transducers are designed to send and receive pulsed ultrasonic signals along a line of transmission extending diagonally across and through the conduit and flow stream. The flowmeter transducers generate appropriate outputs representative of signal transit times in the upstream and downstream directions, and these outputs are coupled to a processor for appropriate calculated derivation of the flowstream velocity. In addition, the processor responds to these outputs to calculate the speed of sound in the flow stream, wherein the speed of sound is variable in accordance with fluid pressure and temperature.

In the preferred form, the sensing system further includes an ultrasonic temperature transducer and an ultrasonic pressure transducer, both of which are mounted on the conduit in a nonintrusive manner and in a predetermined spatial arrangement relative to the flowmeter transducers. The temperature transducer is positioned in longitudinal spaced relation with one of the flowmeter transducers and cooperates therewith to monitor the transit time of an ultrasonic temperature signal longitudinally through the conduit. The transit time of this temperature signal is a direct function of the distance between the cooperating transducers, with this distance in turn being a direct function of conduit wall temperature. An appropriate temperature representative output signal is thus provided to the processor.

The pressure transducer is disposed in a selected circumferentially spaced position relative to one of the other transducers, such as one of the flowmeter transducers, and cooperates therewith to monitor the transit time of an ultrasonic pressure-indicating signal through a portion of the conduit circumference. Since the transit time of the ultrasonic signal is a function of the combined effects of conduit wall temperature and fluid pressure applied to the conduit as hoop stress, a resultant output signal representing these combined effects is supplied to the processor. However, the processor is able to determine the effect attributable to conduit wall temperature based upon the temperature signal as described above, such that the processor can subtract the temperature portion to derive an indication of fluid pressure within the conduit.

The derived fluid pressure level is then compared by the processor with the previously determined fluid sonic velocity. Since the speed of sound in the fluid is a variable according to fluid pressure and temperature, the independent determination of fluid pressure permits the processor to analyze the sonic velocity to determine fluid temperature. Thus, in accordance with the invention, fluid velocity, pressure and temperature are all determined through the use of nonintrusive sensors.

Other features and advantages of the invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
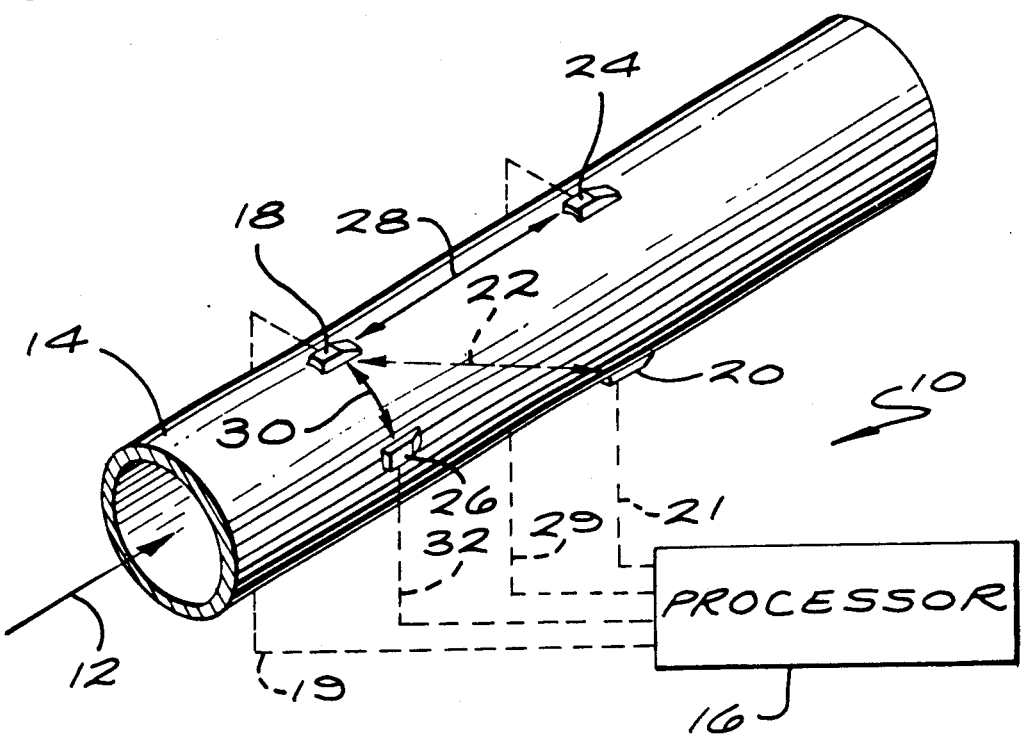
FIG. 1 is a fragmented perspective view of a fluid flow conduit in combination with a nonintrusive flow sensing system embodying the novel features of the invention.

As shown in the exemplary drawings, a nonintrusive flow sensing system referred to generally in FIG. 1 by the reference numeral 10 is provided for monitoring of a fluid flow stream 12 within a conduit 14. The sensing system 10 includes a plurality of transducers mounted on the conduit 14 and adapted to send and received acoustic signals in various directions through the conduit and/or through the flow stream therein. A processor 16 is coupled to the transducers to monitor the transit times of the signals and to derive therefrom an accurate measurement of flow stream parameters such as velocity, temperature and pressure.

The sensing system 10 of the present invention is particularly designed to measure a variety of important fluid parameters with respect to a flow stream passing through a conduit or the like, wherein the monitored parameters are obtained in a wholly nonintrusive or noninvasive manner which avoids the need for sensor probe ports to be formed in the conduit. Accordingly, the system 10 of the present invention can be used safely with hazardous fluids and/or with fluids subjected to significant heat or pressure, without concern for leakage through traditional sensor probe mounting sites. Moreover, the system 10 can be installed quickly and easily onto a conduit during original conduit installation procedures, or subsequently as a retrofit item without any interruption of fluid flow through the conduit.

Figure 2:
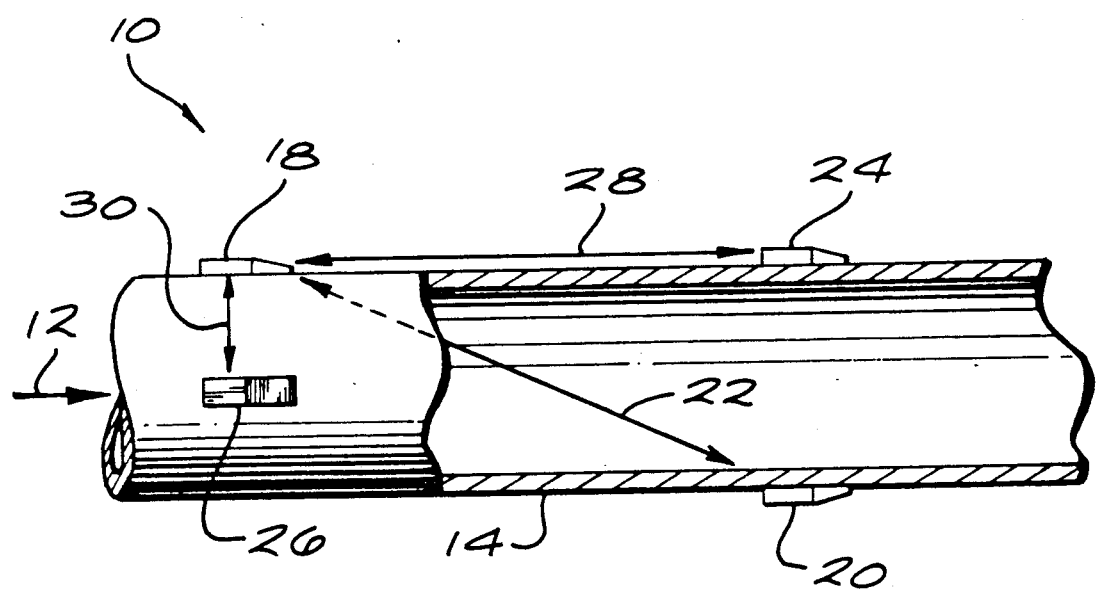
FIG. 2 an enlarged fragmented side elevational view of the conduit and sensing system depicted in FIG. 1.

In general terms, the improved flow sensing system 10 includes a pair of ultrasonic flowmeter transducers 18 and 20 mounted suitably onto the exterior of the conduit 14 at selected spaced positions, as is known in the art with respect to ultrasonic flow sensing systems. These flowmeter transducers 18 and 20 comprise piezoelectric transducers of the so-called shear or Rayleigh clamp-on type adapted to transmit and receive pulsed ultrasonic signals. As shown in FIGS. 1 and 2, the flowmeter transducers 18 and 20 are mounted generally on opposite sides of the conduit and at longitudinally spaced positions such that a line of transmission extends through the conduit walls and across the fluid flow stream in a diagonal manner with a significant component of direction extending upstream and downstream, as indicted by arrow 22.

The processor 16 operates and controls the flowmeter transducers 18 and 20 to monitor the signal transit times in the upstream and downstream directions, such that the transducers provide appropriate outputs 19 and 20 to a first calculator 23 (FIG. 3) forming a portion of the processor 16. This first calculator 23 utilizes algorithms known in the art to derive an accurate indication of flow velocity and speed of sound through the fluid.

In this regard, such ultrasonic flowmeter arrangements are known in the art particularly for use in monitoring flow velocity of a liquid stream in a conduit. The derived flow velocity and sonic velocity are provided as separate outputs 25 and 27 (FIG. 3), respectively, of the first calculator 23. Since the sonic velocity output 27 is a functional variable according to fluid temperature and pressure, the sonic velocity output is utilized further within the processor 16 to determine these parameters, as will be described in more detail.

The sensing system 10 further includes a temperature transducer 24 and a pressure transducer 26 in the form of additional ultrasonic transducers mounted noninvasively on the conduit 14. These temperature and pressure transducers 24 and 26 cooperate with at least one of the flowmeter transducers 18 and 20 to send and receive additional ultrasonic signals through the conduit along controlled paths. The transit times of these additional signals are analyzed by the processor 16 to obtain indication of fluid temperature and pressure.

More specifically, as viewed in FIGS. 1 and 2, the temperature transducer 24 is positioned longitudinally in-line with the flowmeter transducer 18 with a predetermined longitudinal spacing. Ultrasonic signals passed between the transducers 18 and 24 will thus travel through the conduit wall along the path indicated by arrow 28 and exhibit a transit time corresponding with the specific distance of signal travel, wherein variations in the distance are independent of fluid flow velocity or pressure. However, variations in the distance between the transducers 18 and 24 are a direct function of variations in the temperature of the conduit wall, with temperature increase being represented by wall material expansion to increase the inter-transducer distance, and vice versa. Accordingly, the signal transit time between the transducer 18 and 20 represents and can be correlated directly with conduit wall temperature. An output signal 29 from the transducer 24 represents this wall temperature and is provided as one input to a second calculator 31 forming a portion of the processor and adapted to derive fluid pressure.

The pressure transducer 26 is mounted on the conduit 14 at the same longitudinal position or plane with the flowmeter transducer 18, but in a predetermined circumferentially spaced relation. The transit times of ultrasonic signals passed through the wall of the conduit 14 between the transducers 18 and along the path indicated by arrow 30 thus represents the spacing distance, with variations in this spacing being a function of the combined effects of temperature and pressure. That is, increase in conduit wall temperature will result in an increase in the inter-transducer distance. Similarly, an increase in fluid pressure within the conduit 14 will also result in an increase in the inter-transducer distance as a result of hoop stress applied to the conduit wall material. An output 32 from the pressure transducer 26 thus represents a composite of the effects of fluid pressure and conduit wall temperature, and this output 32 is applied as a second input to the pressure calculator 31.

Figure 3:
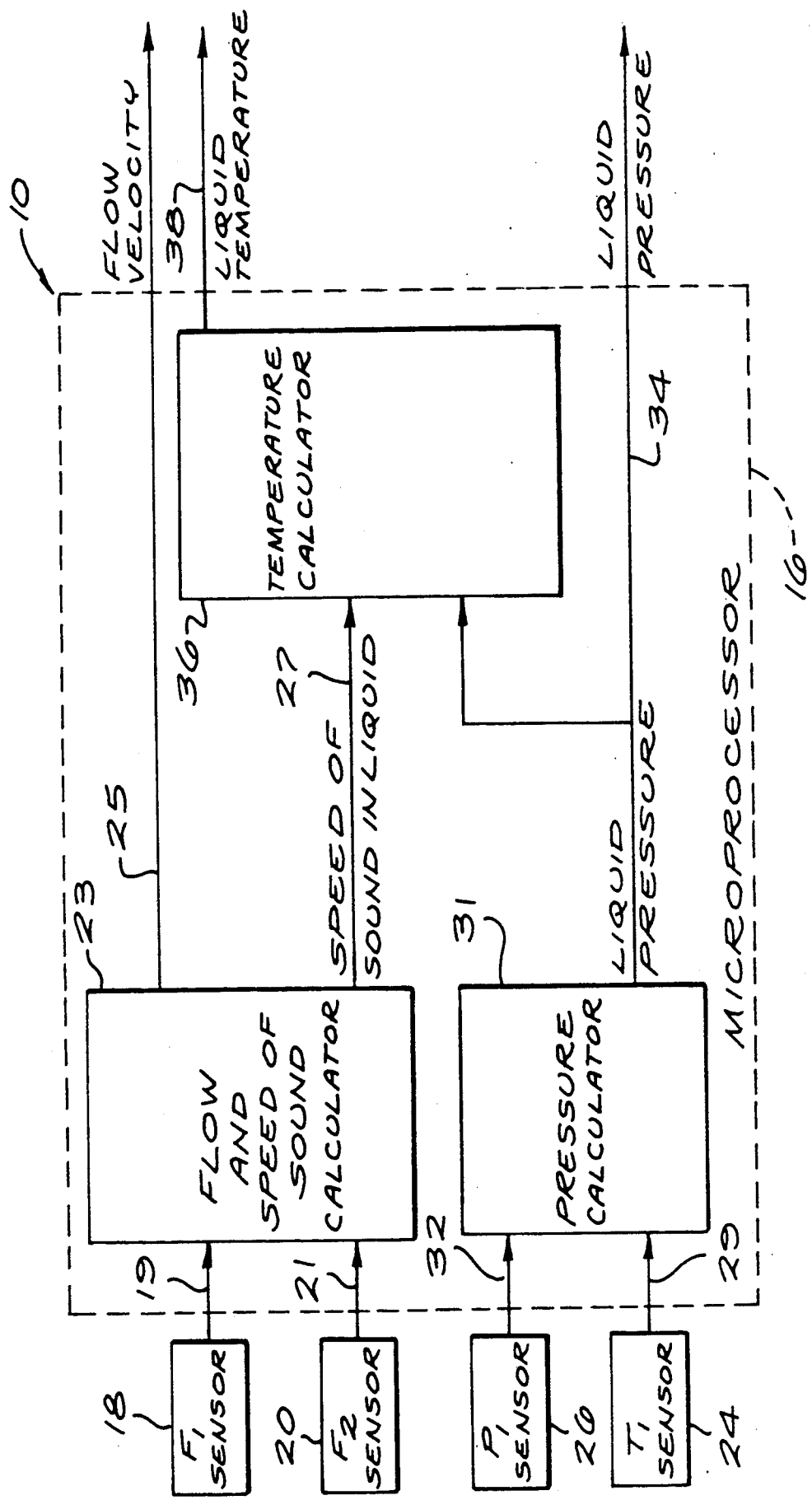
FIG. 3 is a flow chart diagram illustrating the operation of the sensing system to obtain measurements of multiple fluid flow parameters.

The processor 16 receives and analyzes the transit time information from the temperature and pressure transducers 26 and 28 to determine the pressure of the fluid flow stream. More specifically, as shown in FIG. 3, the transit time information from the temperature and pressure transducers is initially supplied to the pressure calculator 31 of the processor 16. In this calculator 31, the effect of conduit wall temperature obtained from the temperature transducer 24 is subtracted as a compensation factor from the combined pressure-temperature indication provided from the pressure transducer 26, thereby permitting calculated derivation of the fluid pressure as an output 34 of the processor 16. This derivation of fluid pressure is obtained through the use of appropriate algorithms known in the art and programmed into the calculator 31.

The derived pressure information is also supplied within the processor 16 to a third calculator 36 forming another portion of the processor 16 and adapted to derive an indication of fluid temperature based upon the transducer transit time information. This temperature calculator 36 receives the fluid sonic velocity signal 27 from the first calculator 23. Since the speed of sound in the flow stream is functionally related to temperature and pressure variations, the calculated pressure information can be utilized by the temperature calculator 36 to provide an accurately derived indication of fluid temperature as another output 38 of the processor. Once again, this derivation of temperature is obtained by the use of appropriate algorithms known in the art.

Accordingly, the sensing system 10 of the present invention provides a significant improvement upon prior art ultrasonic flowmeter systems by providing additional acoustic signals and related transit time measurements to permit derivation of fluid temperature and pressure. These additional parameters are obtained without requiring invasive sensor probes on related mounting ports in the wall of a fluid conduit.

A variety of modifications and improvements to the sensing system 10 will be apparent to those skilled in the art. For example, while the temperature and pressure transducers 24 and 26 are described in conjunction with one of the flowmeter transducers, it will be understood that additional transducers may be used to obtain the desired longitudinal and circumferential transit time measurements. Accordingly, no limitation on the invention is intended by way of the foregoing description and accompanying drawings, except as set forth in the appended claims.

I claim:

1. A fluid flow sensing system for monitoring a fluid flow stream within a conduit, said system comprising:
   first means for bidirectionally sending and receiving acoustic signals generally diagonally across the flow stream between a pair of predetermined and longitudinally spaced points, and for measuring the signal transit times;
   second means for sending and receiving an acoustic signal through the conduit in a longitudinal direction between a pair of predetermined spaced and longitudinally aligned points, and for measuring the signal transit time;
   third means for sending and receiving an acoustic signal through the conduit in a circumferential direction between a pair of predetermined spaced and circumferentially aligned points, and for measuring the signal transit time; and
   processor means responsive to the signal transit times measured by said first, second and third means to provide outputs representative of fluid flow velocity, temperature and pressure.

2. The fluid flow sensing system of claim 1 wherein said first, second and third means each comprises a pair of ultrasonic transducers.

3. The fluid flow sensing system of claim 1 wherein said first, second and third means comprise a plurality of transducers mounted nonintrusively onto the conduit.

4. The fluid sensing system of claim 1 wherein said first means comprises a pair of ultrasonic transmitter-receiver flowmeter transducers mounted generally on opposite sides of the conduit in longitudinally spaced relation, said second means comprising a temperature transducer mounted on the conduit in longitudinally spaced and longitudinally aligned relation with one of said flowmeter transducers, and said third means comprising a pressure transducer mounted on the conduit in circumferentially spaced and circumferentially aligned relation with one of said flowmeter transducers.

5. The fluid flow sensing system of claim 1 wherein said processor means includes first calculation means responsive to the signal transit times measured by said first means to determine the flow velocity of the fluid stream and the speed of sound within the flow stream, second calculator means responsive to the signal transit times measured by said second and third means to determine the pressure of the flow stream, and third calculator means responsive to the speed of sound with the flow stream and the flow stream pressure to determine the temperature of the flow stream.

6. A fluid flow sensing system for monitoring a fluid flow stream within a conduit, said system comprising:
   a plurality of acoustic transducers mounted nonintrusively onto the conduit and adapted to send and receive acoustic signals diagonally across the flow stream between predetermined points with a significant upstream-downstream component of direction, longitudinally through a portion of the conduit between predetermined points, and circumferentially through a portion of the conduit between predetermined points, and to measure the signal transit times; and
   calculation means responsive to the measured signal transit times to determine the velocity, pressure and temperature of the flow stream.

7. A fluid flow sensing system for monitoring a fluid flow stream within a conduit, said system comprising:
   a plurality of acoustic transducers mounted nonintrusively onto the conduit and adapted to send and receive acoustic signals longitudinally through a portion of the conduit between predetermined points, and circumferentially through a portion of the conduit between predetermined points, and to measure the signal transit times; and
   calculation means responsive to the measured signal transit times to determine the pressure of the flow stream.

8. A method of monitoring a fluid flow stream within a conduit, said method comprising the steps of:
   bidirectionally sending and receiving acoustic signals generally diagonally across the flow stream between a pair of predetermined and longitudinally spaced points, and measuring the signal transit times;
   sending and receiving an acoustic signal through the conduit in a longitudinal direction between a pair of predetermined spaced and longitudinally aligned points, and measuring the signal transit time;
   sending and receiving an acoustic signal through the conduit in a circumferential direction between a pair of predetermined spaced and circumferentially aligned points, and measuring the signal transit time; and
   responding to the measured signal transit times to determine fluid flow velocity, temperature and pressure.

9. The method of claim 8 wherein said responding step includes the steps of responding to the diagonal signal transit times to determine flow velocity of the fluid stream and the speed of sound within the flow stream, responding to the longitudinal and circumferential signal transit times to determine the pressure of the flow stream, and responding to the speed of sound within the flow stream and the flow stream pressure to determine the temperature of the flow stream.

10. A method of monitoring a fluid flow stream within a conduit, said method comprising the steps of:

sending and receiving an acoustic signal through the conduit in a longitudinal direction between a pair of predetermined spaced and longitudinally aligned points, and measuring the signal transit time;

sending and receiving an acoustic signal through the conduit in a circumferential direction between a pair of predetermined spaced and circumferentially aligned points, and measuring the signal transit time; and responding to the measured signal transit time to determine fluid pressure within the conduit.

* * * * *